US011895069B2

(12) United States Patent
Liu

(10) Patent No.: US 11,895,069 B2
(45) Date of Patent: Feb. 6, 2024

(54) MESSAGE SENDING METHOD AND MOBILE TERMINAL

(71) Applicant: VIVO MOBILE COMMUNICATION CO., LTD., Guangdong (CN)

(72) Inventor: Ru Liu, Guangdong (CN)

(73) Assignee: Vivo Mobile Communication Co., LTD., Guangdong (CN)

( * ) Notice: Subject to any disclaimer, the term of this patent is extended or adjusted under 35 U.S.C. 154(b) by 0 days.

(21) Appl. No.: 17/577,307

(22) Filed: Jan. 17, 2022

(65) Prior Publication Data

US 2022/0141163 A1 May 5, 2022

Related U.S. Application Data

(63) Continuation of application No. PCT/CN2020/099339, filed on Jun. 30, 2020.

(30) Foreign Application Priority Data

Jul. 22, 2019 (CN) .......................... 201910660528.4

(51) Int. Cl.
*H04L 51/10* (2022.01)
*H04L 51/066* (2022.01)
*H04L 51/08* (2022.01)

(52) U.S. Cl.
CPC ............ *H04L 51/10* (2013.01); *H04L 51/066* (2013.01); *H04L 51/08* (2013.01)

(58) Field of Classification Search
CPC ......... H04L 51/22; H04L 51/10; H04L 51/08; H04L 51/42; H04L 51/56; H04L 51/51; H04L 12/1813; H04L 41/026; H04L 41/5093; H04L 41/15093
See application file for complete search history.

(56) References Cited

U.S. PATENT DOCUMENTS

| 7,996,045 | B1 | 8/2011 | Bauer et al. |
| 8,886,706 | B1* | 11/2014 | Tong .................... G06Q 10/107 709/217 |
| 10,992,626 | B2* | 4/2021 | Choi ........................ H04L 51/42 |

(Continued)

FOREIGN PATENT DOCUMENTS

| CN | 104598245 A | 5/2015 |
| CN | 105549876 A | 5/2016 |

(Continued)

OTHER PUBLICATIONS

The First Office Action of Priority Application No. CN 201910660528.4 issued by the Chinese Patent Office dated Jul. 29, 2020.

(Continued)

*Primary Examiner* — Sargon N Nano
(74) *Attorney, Agent, or Firm* — IP & T GROUP LLP

(57) ABSTRACT

A message sending method includes: receiving at least one first input; adding, in response to each first input, at least one message input box to a message editing interface corresponding to a target contact; receiving at least one second input; and sending message content in a first target input box to the target contact in response to each second input, where the first target input box is a message input box of message input boxes displayed in the message editing interface.

17 Claims, 10 Drawing Sheets

(56) References Cited

U.S. PATENT DOCUMENTS

| | | | |
|---|---|---|---|
| 2011/0145345 A1* | 6/2011 | Wysham | G06Q 10/107 709/206 |
| 2014/0181215 A1* | 6/2014 | Omoko | H04L 51/226 709/206 |
| 2014/0184530 A1* | 7/2014 | Hyun | G06F 1/1643 345/173 |
| 2015/0038987 A1* | 2/2015 | Harris | A61B 17/0469 606/144 |
| 2015/0095801 A1* | 4/2015 | Kim | H04L 51/52 715/752 |
| 2016/0308840 A1* | 10/2016 | Munshi | H04L 51/066 |
| 2017/0288887 A1* | 10/2017 | Wang | H04W 4/14 |
| 2017/0336960 A1* | 11/2017 | Chaudhri | H04L 51/18 |
| 2018/0183743 A1* | 6/2018 | Choi | H04L 51/42 |
| 2019/0089658 A1* | 3/2019 | Kim | G06F 3/0486 |
| 2020/0034033 A1* | 1/2020 | Chaudhri | G06F 3/0482 |
| 2021/0136010 A1* | 5/2021 | Kim | G06Q 10/107 |
| 2021/0200328 A1* | 7/2021 | Dhedhi | G06F 3/0237 |
| 2021/0352040 A1 | 11/2021 | Zong | |

FOREIGN PATENT DOCUMENTS

| | | |
|---|---|---|
| CN | 105988657 A | 10/2016 |
| CN | 107515702 A | 12/2017 |
| CN | 108710526 A | 10/2018 |
| CN | 109814968 A | 5/2019 |
| CN | 109871164 A | 6/2019 |
| CN | 110442279 A | 11/2019 |

OTHER PUBLICATIONS

The Second Office Action of Priority Application No. CN 201910660528.4 issued by the Chinese Patent Office dated Jan. 27, 2021.

International Search Report and Written Opinion of Priority Application No. PCT/CN2020/099339 issued by the Chinese Patent Office dated Oct. 10, 2020.

Extended European Search Report for European Patent Application No. 20844572.6 issued by the European Patent Office dated Jul. 28, 2022.

* cited by examiner

MESSAGE SENDING METHOD AND MOBILE TERMINAL

CROSS-REFERENCE TO RELATED APPLICATIONS

This application is a Bypass Continuation Application of PCT/CN2020/099339 filed on Jun. 30, 2020, which claims priority to Chinese Patent Application No. 201910660528.4 filed on Jul. 22, 2019, which are incorporated herein by reference in their entirety.

TECHNICAL FIELD

The present disclosure relates to the field of communications technologies, and in particular, to a message sending method and a mobile terminal.

BACKGROUND

With the development of various communication applications, communication between people is increasingly dependent on communication applications. During a session with a target contact via a communication application, there may be a case where a first text has been edited, but a second text needs to be first sent to the target contact. In this case, generally, a user first deletes the edited first text, edits the second text and sends it to the target contact, and then re-edits the first text and sends it to the target contact. This operation process is relatively complicated.

SUMMARY

According to a first aspect, an embodiment of the present disclosure provides a message sending method, including:
  receiving at least one first input;
    adding, in response to each first input, at least one message input box to a message editing interface corresponding to a target contact;
  receiving at least one second input; and
  sending message content in a first target input box to the target contact in response to each second input, where the first target input box is one of message input boxes displayed in the message editing interface.
According to a second aspect, an embodiment of the present disclosure further provides a mobile terminal, including:
  a first receiving module, configured to receive at least one first input;
  a first response module, configured to add, in response to each first input, at least one message input box to a message editing interface corresponding to a target contact;
  a second receiving module, configured to receive at least one second input; and
  a second response module, configured to send message content in a first target input box to the target contact in response to each second input, where the first target input box is one of message input boxes displayed in the message editing interface.
According to a third aspect, an embodiment of the present disclosure further provides a mobile terminal, including a processor, a memory, and a computer program stored in the memory and executable on the processor, where when the computer program is executed by the processor, the steps of the foregoing message sending method are implemented.

According to a fourth aspect, an embodiment of the present disclosure further provides a non-transitory computer-readable storage medium, where the non-transitory computer-readable storage medium stores a computer program, and when the computer program is executed by a processor, the steps of the foregoing message sending method are implemented.

BRIEF DESCRIPTION OF DRAWINGS

To describe the technical solutions in the embodiments of the present disclosure more clearly, the following briefly describes the accompanying drawings required for describing the embodiments of the present disclosures. Apparently, the accompanying drawings in the following description show merely some embodiments of the present disclosure, and a person of ordinary skill in the art may still derive other drawings from these accompanying drawings.

DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Usually, in a case where a first text has been edited but a second text needs to be first sent to the target contact, the user may first copy or clip the first text, and paste the first text into an input box and send the first text after sending the second text. This copy and paste method can avoid a complicated process of re-editing the first text but can copy only the last edited content, and therefore has limitations. Moreover, a session may be conducted by setting and using content of a quick message reply, which can eliminate a process of message editing, but cannot meet diversified session communication requirements, and efficiency of sending session messages is low.

Figure 1:
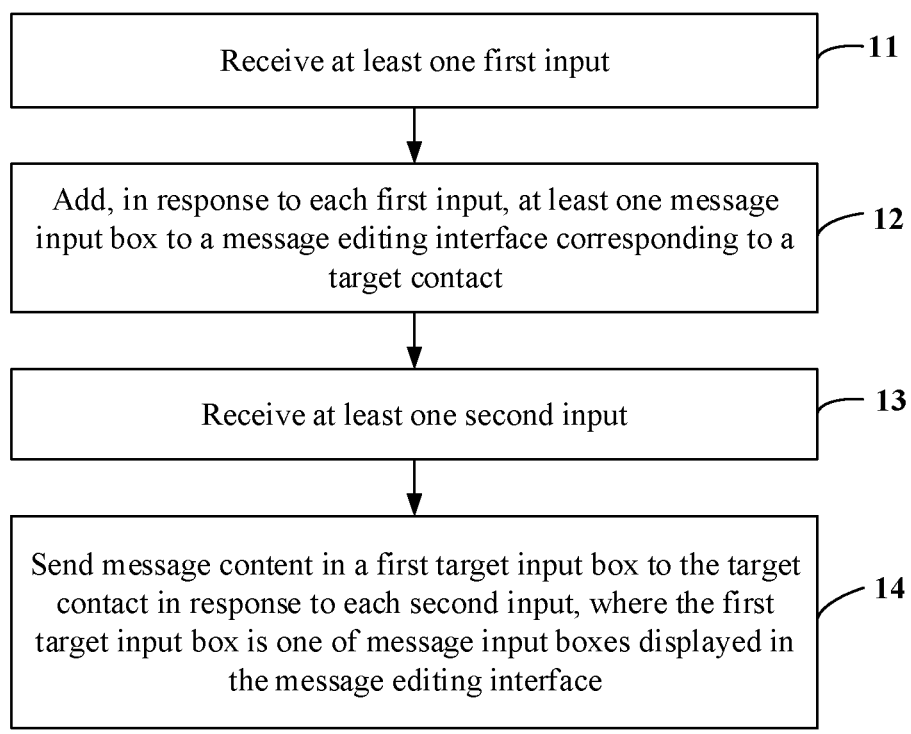
FIG. 1 is a first flowchart of a message sending method according to an embodiment of the present disclosure.

As shown in FIG. 1, an embodiment of the present disclosure provides a message sending method, including the following steps:

Step 11: Receive at least one first input.

Step 12: Add, in response to each first input, at least one message input box to a message editing interface corresponding to a target contact.

Optionally, step 11 may include: receiving N first inputs; and step 12 may include: adding, in response to each of the N first inputs, at least one message input box to the message editing interface corresponding to the target contact.

Optionally, message input boxes displayed in the message editing interface are arranged in a predetermined arrangement mode, for example, arranged in columns (in a single column, in two columns, or the like) or in rows and columns.

For example, the message input boxes in the message editing interface are arranged in columns; the foregoing step 11 may include: receiving an i-th first input, where i is a positive integer; and the foregoing step 12 may include: adding, in response to the i-th first input, at least one message input box to the message editing interface corresponding to the target contact, where the added message input box is arranged at a position after the message input boxes that are already displayed in the message editing interface.

As an implementation, an i-th first input may be received; and one message input box may be added, in response to the i-th first input, to the message editing interface corresponding to the target contact at a position adjacent to a second target input box, where the second target input box is a message input box in an editing state in the message editing interface. For example, the added message input box may be located after or before the second target input box. In addition, the second target input box may alternatively be a message input box arranged at the first or the last position in the message input boxes that are already displayed and arranged in a predetermined order in the message editing interface.

Certainly, as another implementation, an i-th first input may alternatively be received; and a plurality of (for example, two, three, four . . . ) message input boxes may be added, in response to the i-th first input, to the message editing interface corresponding to the target contact at a position adjacent to a second target input box, where the second target input box is a message input box in an editing state in the message editing interface. For example, the added message input boxes may be located after or before the second target input box. In addition, the second target input box may alternatively be a message input box arranged at the first or the last position in the message input boxes that are already displayed and arranged in a predetermined order in the message editing interface.

Optionally, a quantity of message input boxes to be added to the message editing interface in response to the first input may be customized by a user, which can avoid a complicated process of performing a plurality of inputs when a plurality of message input boxes are added.

The first input may be a predetermined input acting on a display screen, for example, an input with a predetermined arc trajectory, an input with a predetermined zigzag trajectory, or an input with another predetermined graphic trajectory.

Figure 2:
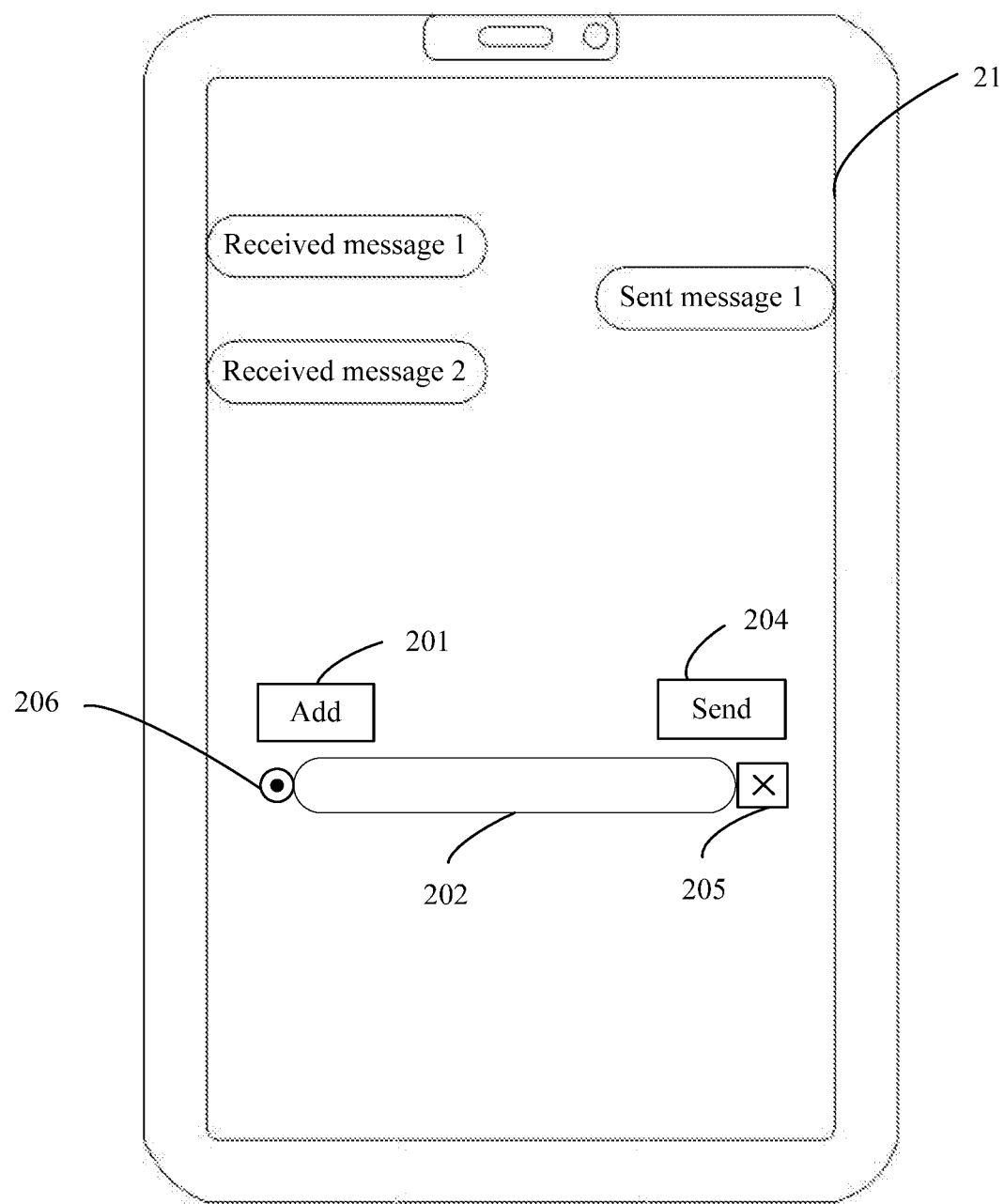
FIG. 2 is a first schematic diagram of a message editing interface according to an embodiment of the present disclosure.
Figure 3:
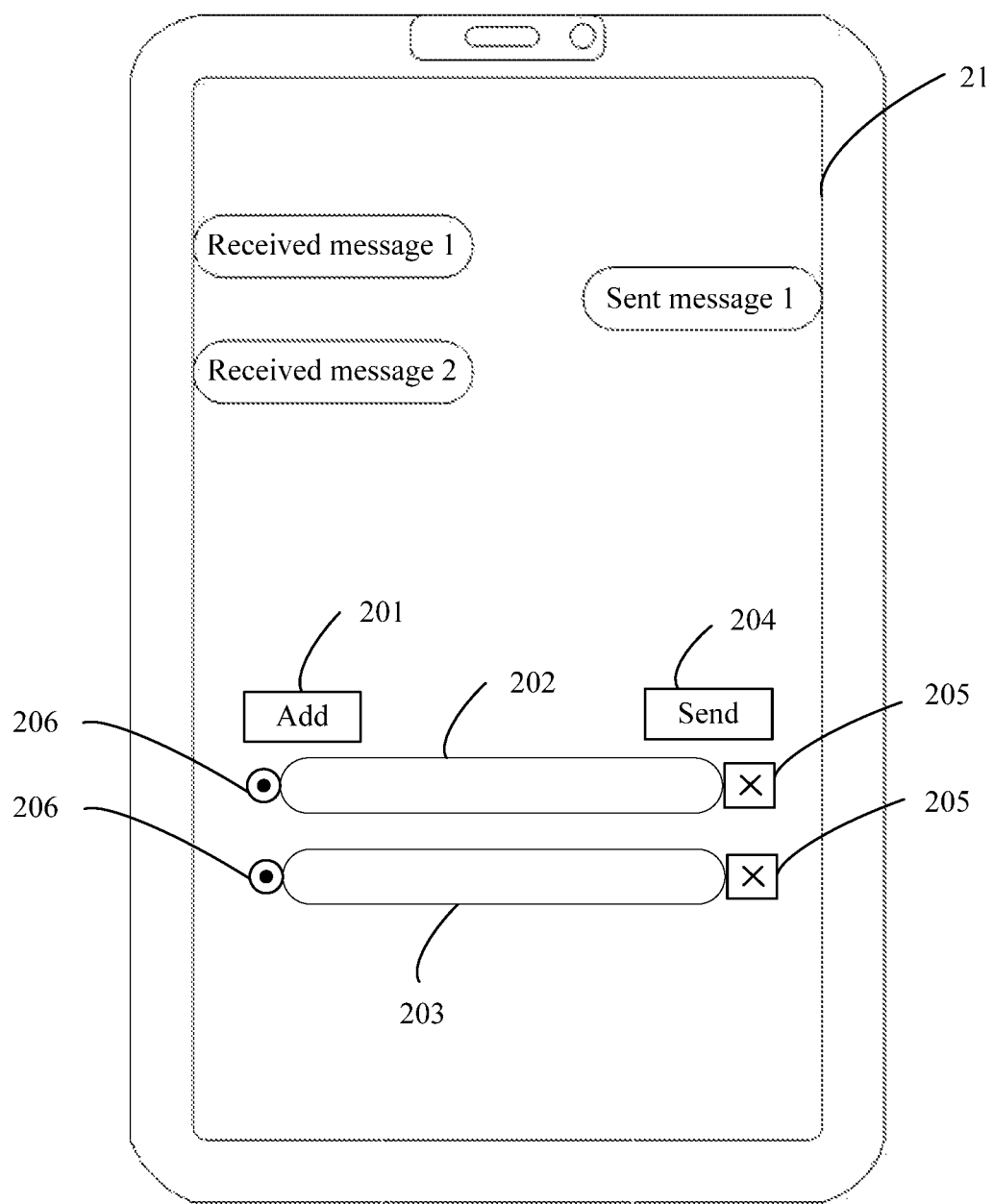
FIG. 3 is a second schematic diagram of a message editing interface according to an embodiment of the present disclosure.

As shown in FIG. 2, the first input may alternatively be an input for an add button 201 in a message editing interface 21. For example, when there is a first message input box 202 in the current message editing interface 21, a second message input box 203 is added to the message editing interface 21 in response to one first input for the add button 201, as shown in FIG. 3; and N second message input boxes 203 are added to the message editing interface 21 in response to N first inputs for the add button 201.

The second target input box is a message input box in an editing state in the message editing interface or a message input box arranged at the last position in the message editing interface.

For example, according to at least one of the foregoing embodiments, in a scenario where the second target input box is a message input box in an editing state in the message editing interface, the second target input box in an editing state is determined from the message input boxes in response to the first input; and in the message editing interface, the added message input boxes are displayed in a predetermined arrangement mode at a position after or before the second target input box.

For example, the first message input box 202 where a cursor is located is the second target input box in an editing state. In this way, a message input box is added to a position after an arrangement position of the second target input box currently in an editing state, to facilitate a user's operations.

Step 13: Receive at least one second input.

Step 14: Send message content in a first target input box to the target contact in response to each second input, where the first target input box is one of message input boxes displayed in the message editing interface.

As an implementation, as shown in FIG. 2 and FIG. 3, a send button 204 is provided in the message editing interface 21. The foregoing step 13 includes: receiving a second input for the send button 204.

The foregoing step 14 may be implemented in a manner including but being not limited to the following:

Manner 1: Send respectively corresponding message contents in the message input boxes in sequence in response to the second input according to a predetermined arrangement order of the message input boxes in the message editing interface.

The predetermined arrangement order of the message input boxes in the message editing interface may be adjusted by the user according to needs. For example, the user may drag one of the message input boxes to a target position, to adjust the arrangement order of the message input boxes in the message editing interface, so that the respectively corresponding message contents in the message input boxes are sent in sequence according to the arrangement order after the adjustment. In this way, a plurality of messages may be sent to the target contact by performing one sending operation, helping simplify the user's operations.

Optionally, when there is no corresponding message content in a message input box arranged at the k-th position in the message input boxes, no message content in the message input box arranged at the k-th position is sent, and message content in a message input box arranged at the (k+1)-th position continues to be sent, where k is a positive integer and is less than or equal to a quantity of message input boxes that are already displayed in the message editing interface.

Manner 2: The foregoing step 13 may include: receiving a j-th second input, where j is a positive integer; and the foregoing step 14 may include: determining, in response to the j-th second input, a message input box arranged at the j-th position in the message input boxes that are arranged and displayed in a predetermined order in the message editing interface as the first target input box, and sending the message content in the first target input box to the target contact.

For example, there are three message input boxes already displayed and arranged in sequence in a single column in a current message editing interface: a first message input box, a second message input box, and a third message input box. When a 1-st second input is received, message content in the first message input box is sent to the target contact; when a 2-nd second input is received, message content in the second message input box is sent to the target contact; and when a 3-rd second input is received, message content in the third message input box is sent to the target contact.

In this way, contents in message input boxes associated with an input order of a plurality of second inputs are sent in sequence according to the input order, so that continuous multiple times of sending are implemented, and a message input box whose message content is already sent may not be deleted, thereby avoiding a complicated process of adding a message input box again when an order of messages to be sent needs to be adjusted next time.

Manner 3: After the foregoing step 14, the method may further include: deleting the first target input box, where the first target input box is a message input box arranged at the first position in the message input boxes that are arranged and displayed in a predetermined order in the message editing interface.

For example, the first target input box is the message input box arranged at the first position in the message input boxes that are arranged and displayed in the predetermined order in the message editing interface. In this way, after the message content in the first target input box is sent to the target contact, the first target input box is deleted, so that a message input box that is originally arranged at the second position is rearranged at the first position in turn, which can ensure that message content in the message input box rearranged at the first position is sent to the target contact in response to a next second input, thereby implementing continuous sending of message contents without a need to manually adjust the order of the message input boxes.

Optionally, to facilitate the user's operations, a message input box may be added to the message editing interface in response to the first input, and the message input box is in an editing state. In this way, after adding the message input box, the user may directly edit message content to be first sent in the message input box, and then adjust an arrangement position of the message input box to the first position, to directly send the message content in the message input box to the target contact in response to the second input.

In addition, a first message input box is added to the message editing interface in response to the first input, and the first message input box is arranged at a position after an arrangement position of a second message input box (for example, the second message input box is arranged at the first position, so that the second message input box is the first target input box) currently in an editing state. The user may alternatively clip and paste message content in the second message input box into the first target input box, and edit the message content to be sent in advance in the second message input box.

Optionally, to simplify the user's operations, a message input box, namely, the first target input box may alternatively be added, in response to the first input, to the message editing interface at the first arrangement position of the message input boxes, so that after adding the first target input box, the user directly edits message content to be first sent in the first target input box, to directly send the message content in the first target input box to the target contact in response to the second input, thereby simplifying a process of order adjustment.

For example, the foregoing method is described below with reference to examples.

Figure 4:
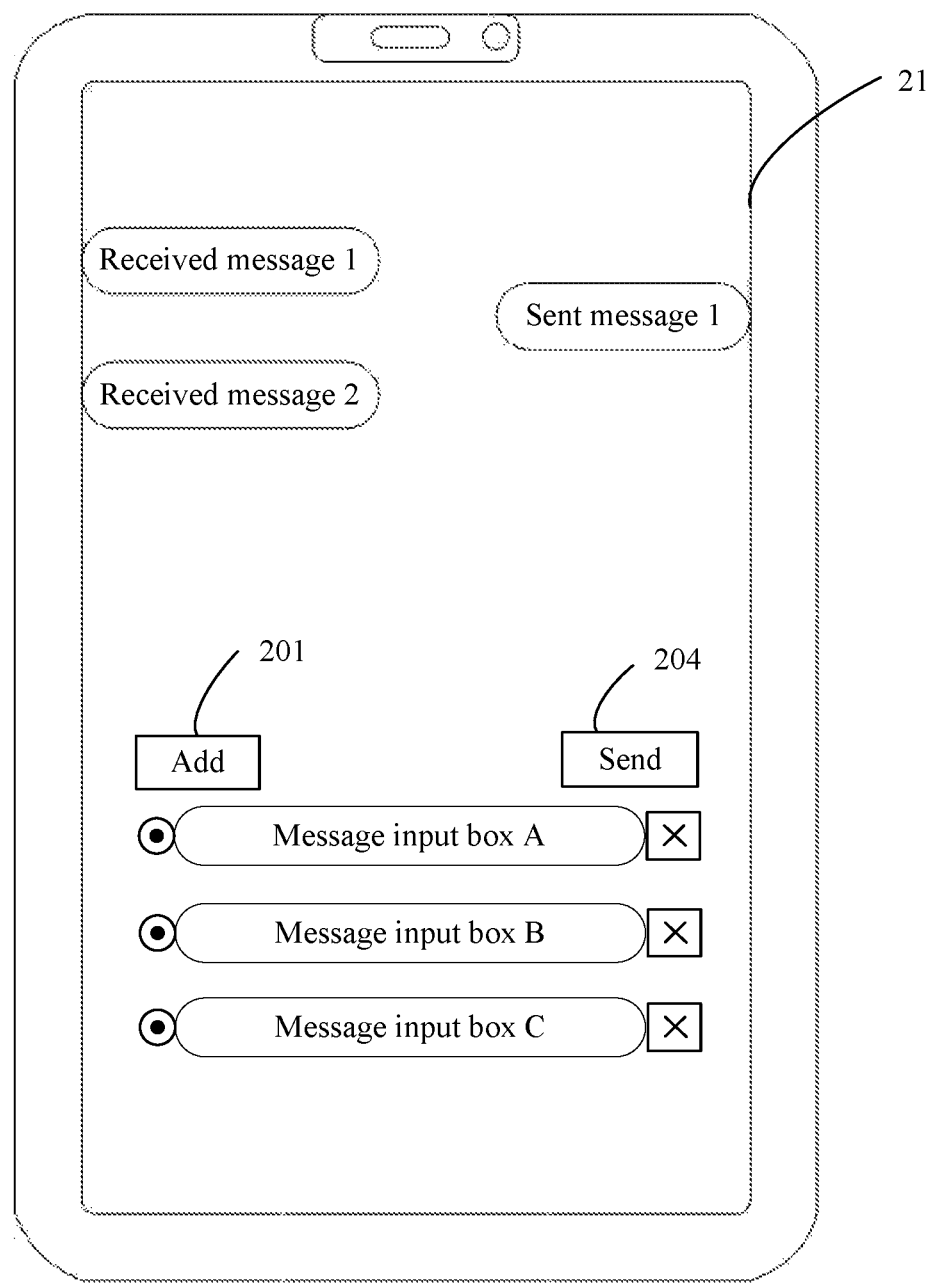
FIG. 4 is a third schematic diagram of a message editing interface according to an embodiment of the present disclosure.

As shown in FIG. 4, there are three message input boxes A, B, and C displayed in a message editing interface 21, where the message input box A is arranged at the first position, the message input box B is arranged at the second position, and the message input box C is arranged at the third position.

In this case, a second input for a send button 204 in the message editing interface 21 is received, and content in the message input box A is sent to the target contact in response to the second input.

Figure 5:
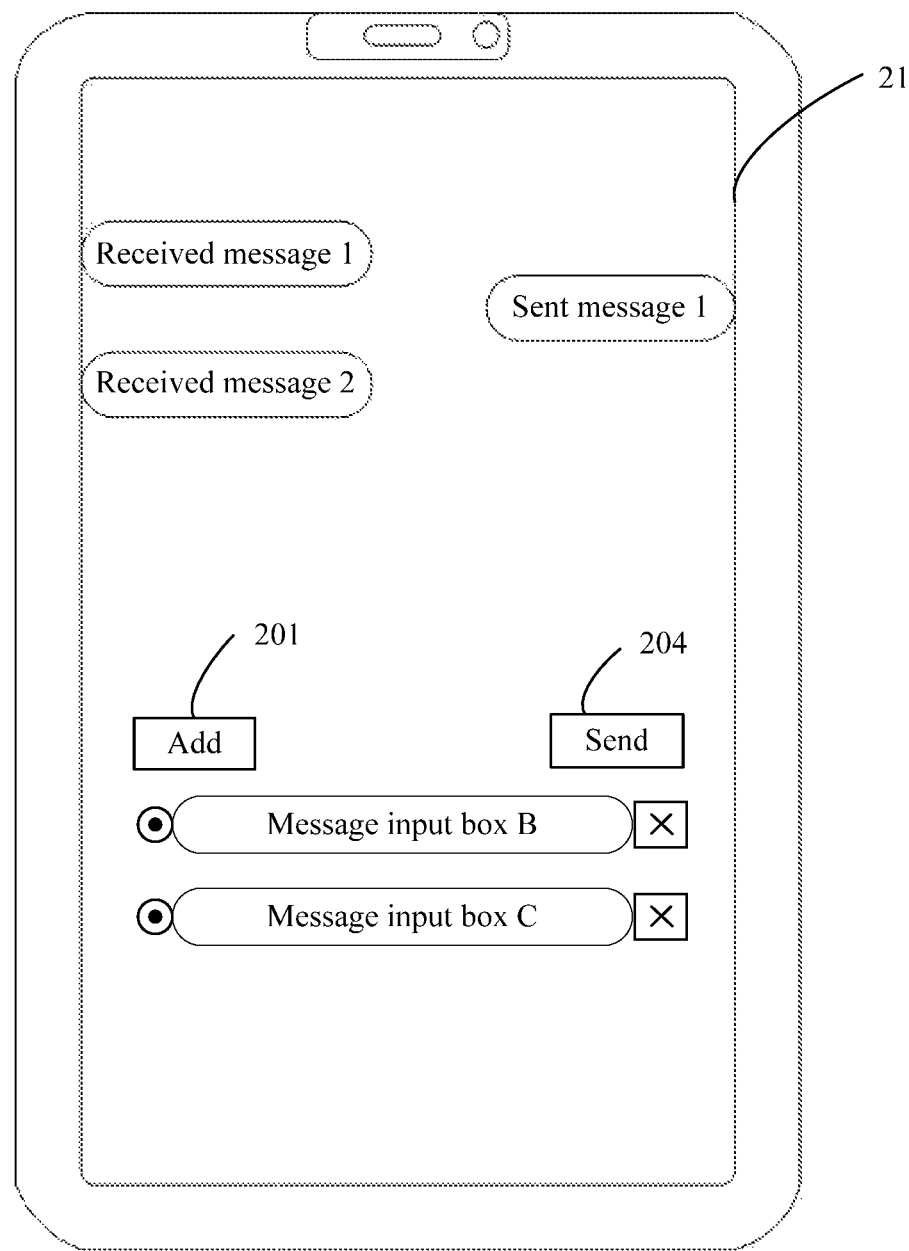
FIG. 5 is a fourth schematic diagram of a message editing interface according to an embodiment of the present disclosure.

Optionally, after the content in the message input box A is sent to the target contact, the message input box A is deleted from the message editing interface 21, that is, display of the message input box A in the message editing interface 21 is canceled, so that the message input box B is rearranged at the first position in turn, and the message input box C is rearranged at the second position in turn, as shown in FIG. 5. In this way, when the second input for the send button 204 in the message editing interface 21 is received again, content in the message input box B currently arranged at the first position is sent to the target contact in response to the second input.

Optionally, after the content in the message input box B is sent to the target contact, the message input box B is deleted from the message editing interface 21, that is, display of the message input box B in the message editing interface 21 is canceled, so that the message input box C is rearranged at the first position in turn. Other cases are similar, and details are not described herein again.

It should be noted that, after the message input box is deleted from the message editing interface 21, the foregoing steps 11 to 14 may further be repeated, and details are not described herein again.

Figure 6:
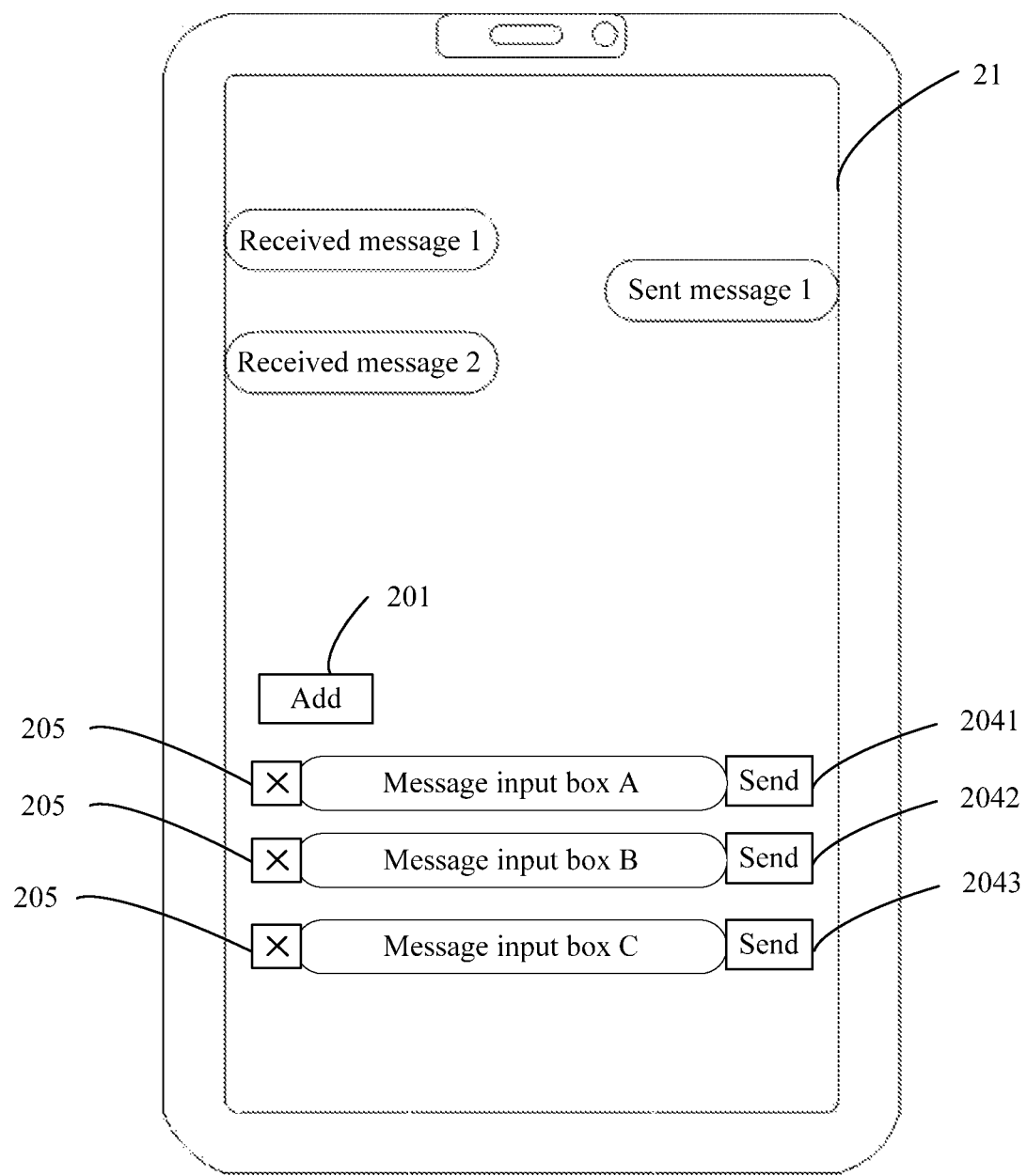
FIG. 6 is a fifth schematic diagram of a message editing interface according to an embodiment of the present disclosure.
Figure 7:
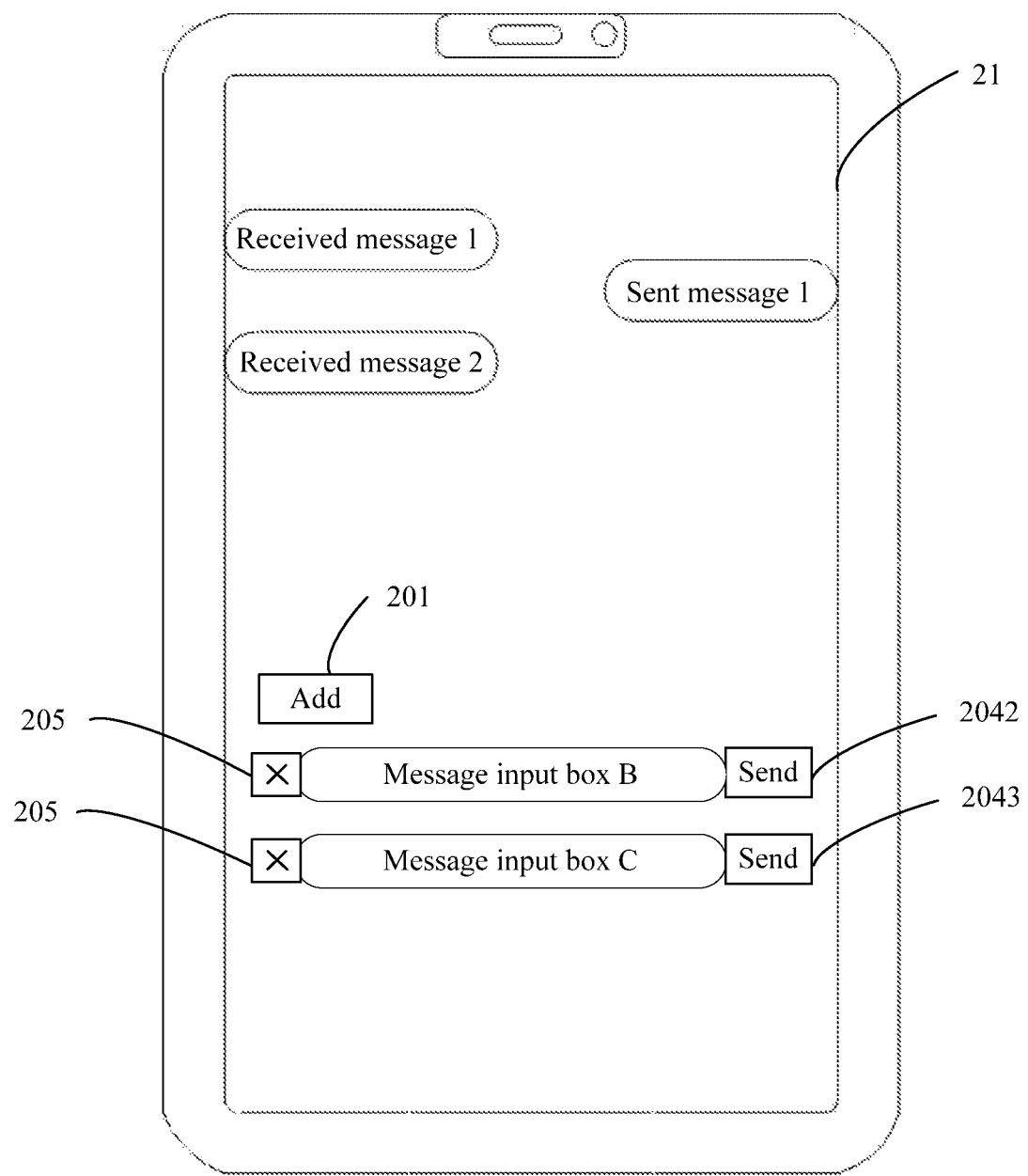
FIG. 7 is a sixth schematic diagram of a message editing interface according to an embodiment of the present disclosure.

As another implementation, as shown in FIG. 6 and FIG. 7, each of the message input boxes displayed in the message editing interface 21 corresponds to a send button; and the foregoing step 13 may include: receiving a second input for a target send button, where the target send button is one of the send buttons corresponding to the message input boxes.

The foregoing step 14 may include: sending, in response to the second input, the message content in the first target input box corresponding to the target send button to the target contact.

As shown in FIG. 6, there are three message input boxes A, B, and C displayed in a message editing interface 21, where the message input box A corresponds to a send button 2041, the message input box B corresponds to a send button 2042, and the message input box C corresponds to a send button 2043. In this case, each of the message input boxes corresponds to one send button, so that message content in each message input box is sent via the send button corresponding to the message input box, thereby reducing a step of adjusting an arrangement order of the message input boxes, and achieving higher flexibility.

Optionally, in a case that the first target input box is the message input box A in FIG. 6, after the message content in the message input box A is sent to the target contact in response to the second input for the send button 2041 corresponding to the message input box A, the message input box A may alternatively be deleted from the message editing interface 21, that is, display of the message input box A in the message editing interface 21 is canceled, as shown in FIG. 7.

It should be noted that, there is no strict limitation to a timing sequence between the foregoing steps 11 and 12 as well as between 13 and 14. In other words, after the first input is received and at least one message input box is added, in response to the first input, to the message editing interface corresponding to the target contact, the second input may be received and the message content in the first target input box may be sent to the target contact in response to the second input; and at least one first input may further be received and at least one message input box may be added, in response to the first input, to the message editing interface corresponding to the target contact.

Alternatively, at least one first input may be first received and at least one message input box may be added, in response to the first input, to the message editing interface corresponding to the target contact; then the second input may be received and the message content in the first target input box may be sent to the target contact in response to the second input; and at least one first input may further be received and at least one message input box may be added, in response to the first input, to the message editing interface corresponding to the target contact.

In the foregoing solutions, message contents may be respectively edited in a plurality of message input boxes, which avoids a complicated process in which first message content that has been edited in a message input box needs to be first deleted, and then re-edited after second message content that needs to be first sent to the target contact is edited and sent to the target contact, thereby resolving problems such as that a required operation of temporarily adjusting an order of message contents to be sent in a message sending process is complicated and time-consuming, simplifying a user's operations, and helping improve message sending efficiency.

Figure 8:
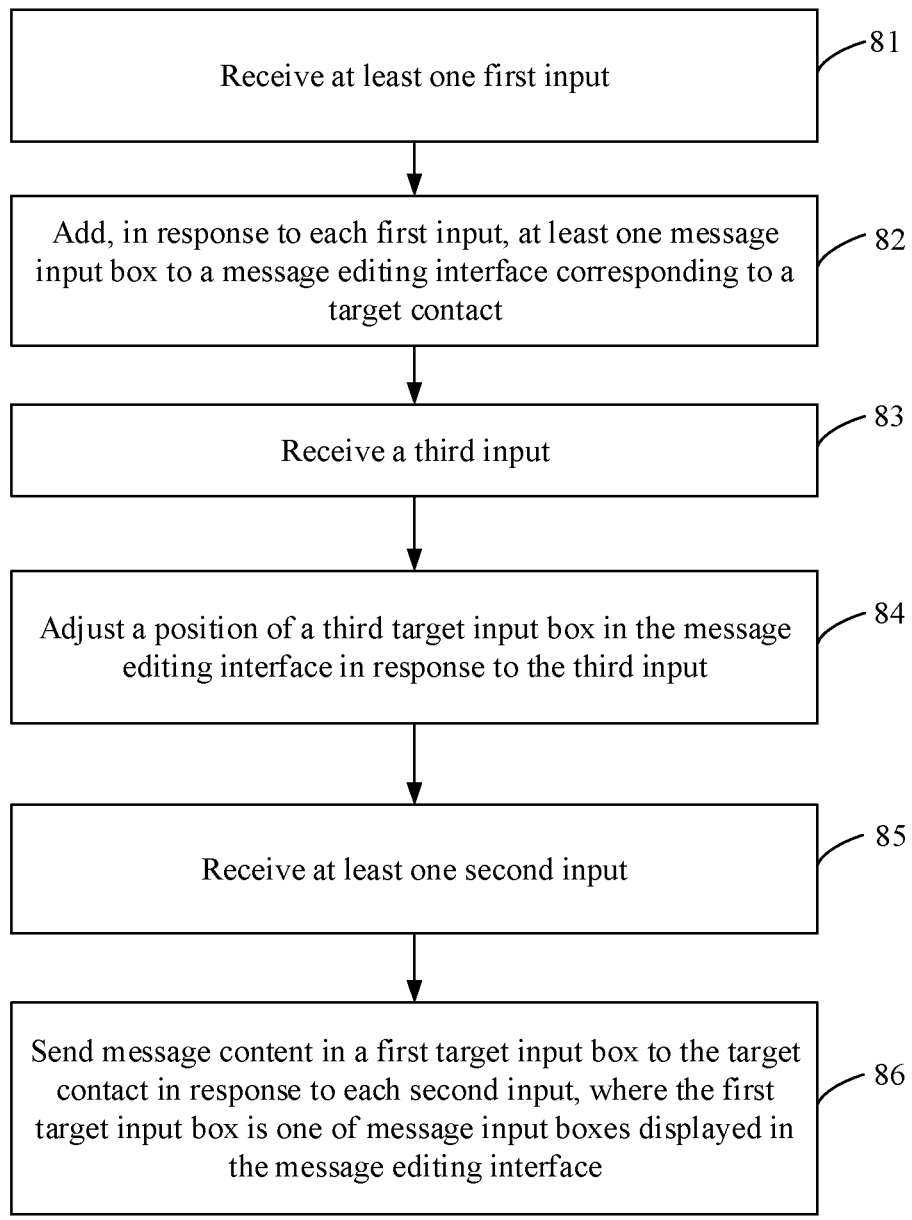
FIG. 8 is a second flowchart of a message sending method according to an embodiment of the present disclosure.

As shown in FIG. 8, an embodiment of the present disclosure further provides a message sending method, including the following steps:

Step 81: Receive at least one first input.

Step 82: Add, in response to each first input, at least one message input box to a message editing interface corresponding to a target contact.

Step 83: Receive a third input.

Step 84: Adjust a position of a third target input box in the message editing interface in response to the third input.

Optionally, the foregoing step 83 may include: receiving a third input for the third target input box, where the third target input box is one of message input boxes displayed in the message editing interface. The foregoing step 84 may include: adjusting a display position of the third target input box in the message editing interface in response to the third input, where the third target input box is one of the message input boxes already displayed in the message editing interface.

For example, an operation point of the third input is determined as a target position in response to the third input, and the third target input box is adjusted to the target position.

As an implementation, the third input may be a drag input acting on the third target input box; an input final position of the drag input is determined as a target position; and the third target input box is adjusted to the target position.

Optionally, the drag input is activated by a deep-pressing operation that acts on the third target input box and whose pressing force exceeds a present threshold, thereby guaranteeing accuracy of the operation, and avoiding misoperations. In addition, the drag input may be an input acting on the third target input box at any position. Because an operation region of the third target input box may meet operation requirements, thereby helping guarantee operation accuracy, and avoid misoperations.

As another implementation, as shown in FIG. 2 and FIG. 3, each first message input box and each second message input box separately corresponds to a moving button 206.

As shown in FIG. 3, in a case that the third input is a first slide input for the moving button 206 corresponding to the second message input box 203, for example, a slide direction of the first slide input is upward, the second message input box 203 is moved upward by one position, that is, a position of the second message input box 203 is interchanged with a position of the first message input box 202; and in a case that the third input is a second slide input acting on the moving button 206 corresponding to the first message input box 202, for example, a slide direction of the second slide input is downward, the first message input box 202 is moved downward by one position, that is, the position of the second message input box 203 is interchanged with the position of the first message input box 202.

In addition, the third input may alternatively be a drag input acting on the moving button 206 corresponding to the third target input box; an input final position of the drag input is determined as a target position; and the third target input box is adjusted to the target position.

In this embodiment, an arrangement order of message input boxes may be dynamically adjusted according to user needs, for example, the corresponding moving button 206 on the left side of each message input box may be pressed to drag the message input box upward and downward, to adjust the arrangement order of the message input box.

Step 85: Receive at least one second input.

Step 86: Send message content in a first target input box to the target contact in response to each second input, where the first target input box is one of message input boxes displayed in the message editing interface.

Optionally, after the foregoing step 86, the method may further include: deleting the first target input box from the message editing interface, that is, canceling display of the first target input box in the message editing interface.

On a basis that the user may dynamically adjust the arrangement order of message input boxes according to needs, optionally, a send button 204 is provided in a message editing interface 21, as shown in FIG. 2 and FIG. 3.

The foregoing step 85 includes: receiving a second input for the send button 204.

The foregoing step 86 may be implemented in a manner including but being not limited to the following:

Manner 1: Send respectively corresponding message contents in the message input boxes in sequence in response to the second input according to a predetermined arrangement order of the message input boxes in the message editing interface.

Optionally, when there is no corresponding message content in a message input box arranged at the k-th position in the message input boxes, no message content in the message input box arranged at the k-th position is sent, and message content in a message input box arranged at the (k+1)-th position continues to be sent, where k is a positive integer and is less than or equal to a quantity of message input boxes that are already displayed in the message editing interface.

Manner 2: The foregoing step 13 may include: receiving a j-th second input, where j is a positive integer; and the foregoing step 14 may include: determining, in response to the j-th second input, a message input box arranged at the j-th position in the message input boxes that are arranged and displayed in a predetermined order in the message editing interface as the first target input box, and sending the message content in the first target input box to the target contact.

For example, there are three message input boxes already displayed and arranged in sequence in a column in a current message editing interface: a first message input box, a second message input box, and a third message input box. When a 1-st second input is received, message content in the first message input box is sent to the target contact; when a 2-nd second input is received, message content in the second message input box is sent to the target contact; and when a 3-rd second input is received, message content in the third message input box is sent to the target contact.

In this way, contents in message input boxes associated with an input order of a plurality of second inputs are sent in sequence according to the input order, so that continuous multiple times of sending are implemented, and a message input box whose message content is already sent may not be deleted, thereby avoiding a complicated process of adding a message input box again when an order of messages to be sent needs to be adjusted next time.

Manner 3: After the foregoing step 14, the method may further include: deleting the first target input box, where the first target input box is a message input box arranged at the first position in the message input boxes that are arranged and displayed in a predetermined order in the message editing interface.

For example, the first target input box is the message input box arranged at the first position in the message input boxes that are arranged and displayed in a predetermined order in the message editing interface. In this way, after the message content in the first target input box is sent to the target contact, the first target input box is deleted, so that a message input box that is originally arranged at the second position is rearranged at the first position in turn, which can ensure that message content in the message input box rearranged at the first position is sent to the target contact in response to a next second input, thereby implementing continuous sending of message contents without a need to manually adjust the order of the message input boxes.

Optionally, to facilitate the user's operations, a message input box may be added to the message editing interface in response to the first input, and the message input box is in an editing state. In this way, after adding the message input box, the user may directly edit message content to be first sent in the message input box, and then adjust an arrangement position of the message input box to the first position, to directly send the message content in the message input box to the target contact in response to the second input.

In addition, a first message input box is added to the message editing interface in response to the first input, and the first message input box is arranged at a position after an arrangement position of a second message input box (for example, the second message input box is arranged at the first position, so that the second message input box is the first target input box) currently in an editing state. The user may alternatively clip and paste message content in the second message input box into the first target input box, and edit the message content to be sent in advance in the second message input box.

Optionally, to simplify the user's operations, a message input box, namely, the first target input box may alternatively be added, in response to the first input, to the message editing interface at the first arrangement position of the message input boxes, so that after adding the first target input box, the user directly edits message content to be first sent in the first target input box, to directly send the message content in the first target input box to the target contact in response to the second input, thereby simplifying a process of order adjustment.

It should be noted that, after the message input box is deleted from the message editing interface 21, the foregoing steps 81 to 86 may further be repeated, and details are not described herein again. In addition, it also should be noted that, an execution sequence of the foregoing steps 81 to 86 is not limited to that in the foregoing embodiment, for example, steps 83 and 84 may be executed after step 86, may be executed after one first input is received and a response to the first input is made, or may be executed after one second input is received and a response to the second input is made.

In the foregoing solutions, message contents are respectively edited in a plurality of message input boxes, which avoids a complicated process in which first message content that has been edited in a message input box needs to be first deleted, and then re-edited after second message content that needs to be first sent to the target contact is edited and sent to the target contact, thereby resolving problems such as that a required operation of temporarily adjusting an order of message contents to be sent in a message sending process is complicated and time-consuming, thereby simplifying a user's operations, and helping improve message sending efficiency. In addition, an arrangement order of the message input boxes can be dynamically adjusted, that is, sending an order of message contents respectively corresponding to the message input boxes is adjusted, thereby guaranteeing quick adjustment of the sending order of message contents.

Figure 9:
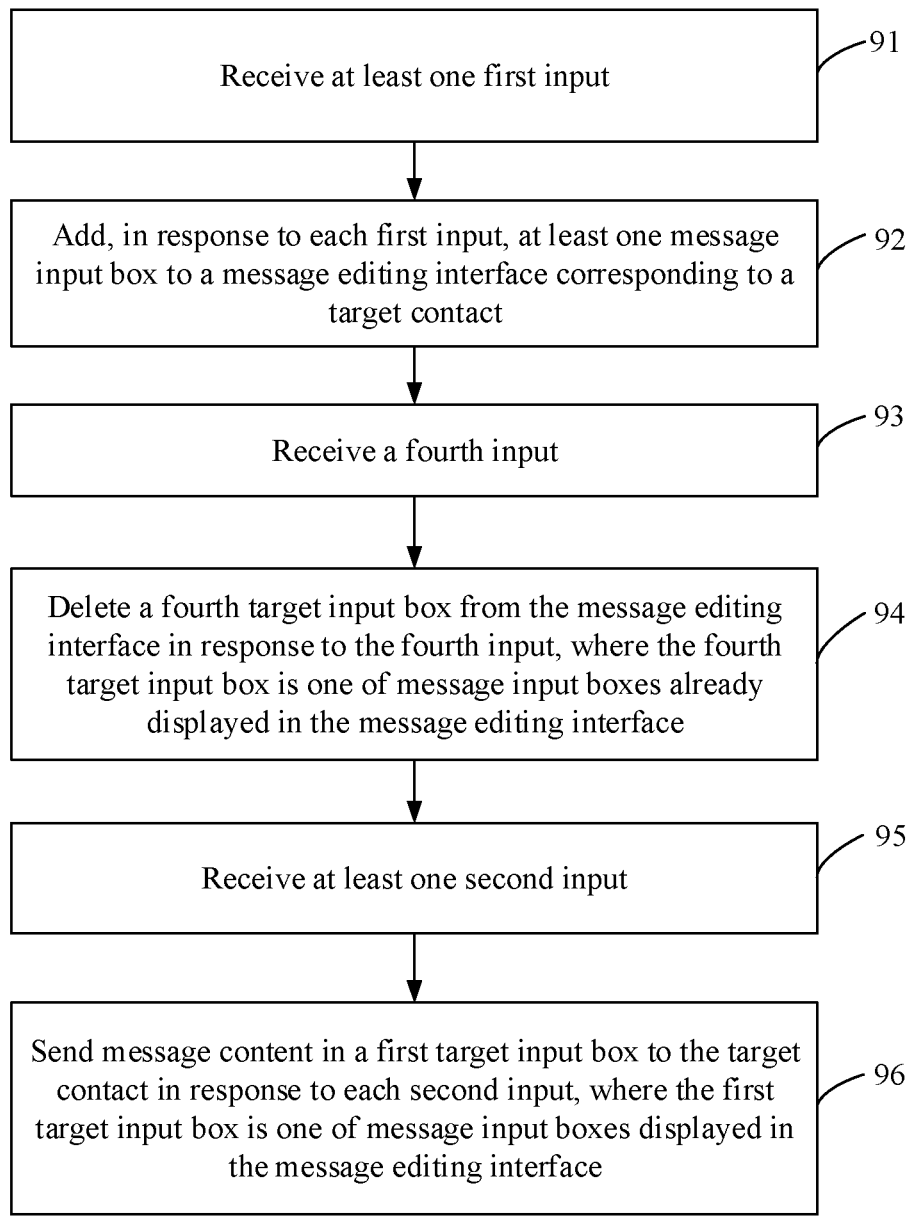
FIG. 9 is a third flowchart of a message sending method according to an embodiment of the present disclosure.

As shown in FIG. 9, an embodiment of the present disclosure further provides a message sending method, including the following steps:

Step 91: Receive at least one first input.

Step 92: Add, in response to each first input, at least one message input box to a message editing interface corresponding to a target contact.

Step 93: Receive a fourth input.

Step 94: Delete a fourth target input box from the message editing interface in response to the fourth input, where the fourth target input box is one of message input boxes already displayed in the message editing interface.

As an implementation, the fourth input may be a leftward-slide input acting on the fourth target input box; and display of the fourth target input box in the message editing interface is canceled in response to the leftward-slide input, that is, the fourth target input box is deleted from the message editing interface.

As another implementation, as shown in FIG. 2 to FIG. 7, each first message input box and each second message input box separately corresponds to a delete button 205.

The foregoing step 93 may include: receiving a fourth input for a target delete button, where the target delete button is one of the delete buttons corresponding to the message input boxes; and the foregoing step 94 may include: deleting, in response to the fourth input, the message input box corresponding to the target delete button. In this way, display of the message input box corresponding to the target delete button in the message editing interface is canceled via the fourth input for the target delete button, that is, the message input box corresponding to the target delete button is deleted.

Step 95: Receive at least one second input.

Step 96: Send message content in a first target input box to the target contact in response to each second input, where the first target input box is one of message input boxes displayed in the message editing interface.

Optionally, after step 96, the method may further include: deleting the first target input box from the message editing interface, that is, canceling display of the first target input box in the message editing interface.

For example, for details about the message sending method, refer to the description of the above embodiments, and the details are not described herein again.

It should be noted that, after the message input box is deleted from the message editing interface, the foregoing steps 91 to 96 may further be repeated, and details are not described herein again. In addition, it also should be noted that, an execution sequence of the foregoing steps 91 to 96 is not limited to that in the foregoing embodiment, for example, steps 93 and 94 may be executed after step 96, may be executed after one first input is received and a response to the first input is made, or may be executed after one second input is received and a response to the second input is made.

In the foregoing solutions, message contents may be respectively edited in a plurality of message input boxes, which avoids a complicated process in which first message content that has been edited in a message input box needs to be first deleted, and then re-edited after second message content that needs to be first sent to the target contact is edited and sent to the target contact, thereby resolving problems such as that a required operation of temporarily adjusting an order of message contents to be sent in a message sending process is complicated and time-consuming, simplifying a user's operations, and helping improve message sending efficiency. In addition, any of a plurality of message input boxes may be deleted, thereby guaranteeing flexible adjustment in a sequence and a quantity of the plurality of message input boxes.

Figure 10:
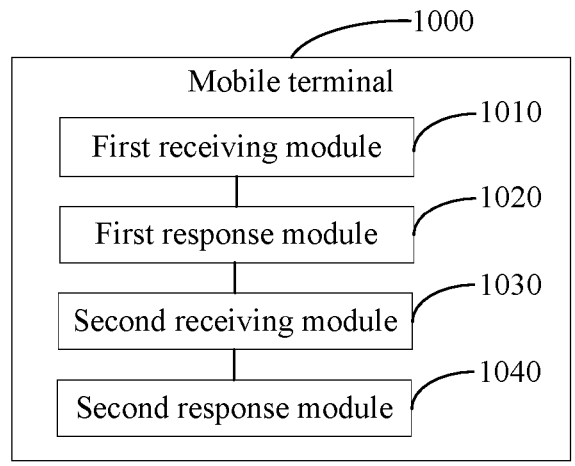
FIG. 10 is a block diagram of a mobile terminal according to an embodiment of the present disclosure.

As shown in FIG. 10, an embodiment of the present disclosure further provides a mobile terminal 1000, including:
- a first receiving module 1010, configured to receive at least one first input;
- a first response module 1020, configured to add, in response to each first input, at least one message input box to a message editing interface corresponding to a target contact;
- a second receiving module 1030, configured to receive at least one second input; and
- a second response module 1040, configured to send message content in a first target input box to the target contact in response to each second input, where the first target input box is one of message input boxes displayed in the message editing interface.

Optionally, the first receiving module 1010 includes:
- a first receiving unit, configured to receive an i-th first input, where i is a positive integer; and the first response module includes:
- a first response unit, configured to add, in response to the i-th first input, at least one message input box to the message editing interface at a position adjacent to a second target input box, where
- the second target input box is a message input box in an editing state in the message editing interface.

Optionally, the second receiving module 1020 includes:
- a second receiving unit, configured to receive a j-th second input, where j is a positive integer; and the second response module includes:
- a second response unit, configured to determine, in response to the j-th second input, a message input box arranged at the j-th position in the message input boxes that are arranged and displayed in a predetermined order in the message editing interface as the first target input box, and send the message content in the first target input box to the target contact.

Optionally, the mobile terminal 1000 further includes:
- a deletion module, configured to delete the first target input box, where the first target input box is a message input box arranged at the first position in the message input boxes that are arranged and displayed in a predetermined order in the message editing interface.

Optionally, each of the message input boxes displayed in the message editing interface corresponds to a send button; and the second receiving module 1030 includes:
- a third receiving unit, configured to receive a second input for a target send button, where the target send button is one of the send buttons corresponding to the message input boxes; and the second response module includes:
- a third response unit, configured to send, in response to the second input, message content in a message input box corresponding to the target send button to the target contact.

Optionally, the mobile terminal 1000 further includes:
- a third receiving module, configured to receive a third input for a third target input box, where the third target input box is one of the message input boxes displayed in the message editing interface; and
- a third response module, configured to adjust a display position of the third target input box in the message editing interface in response to the third input.

Optionally, each of the message input boxes displayed in the message editing interface corresponds to a delete button; and the mobile terminal 1000 further includes:
- a fourth receiving module, configured to receive a fourth input for a target delete button, where the target delete button is one of the delete buttons corresponding to the message input boxes; and
- a fourth response module, configured to delete, in response to the fourth input, a message input box corresponding to the target delete button.

The mobile terminal provided in this embodiment of the present disclosure can implement the processes implemented by the mobile terminal in the method embodiments in FIG. 1 to FIG. 9. To avoid repetition, details are not described herein again.

According to the mobile terminal 1000 provided in this embodiment of the present disclosure, message contents may be respectively edited in a plurality of message input boxes, which avoids a complicated process in which first message content that has been edited in a message input box needs to be first deleted, and then re-edited after second message content that needs to be first sent to the target contact is edited and sent to the target contact, thereby resolving problems such as that a required operation of temporarily adjusting an order of message contents to be sent in a message sending process is complicated and time-consuming, simplifying a user's operations, and helping improve message sending efficiency.

Figure 11:
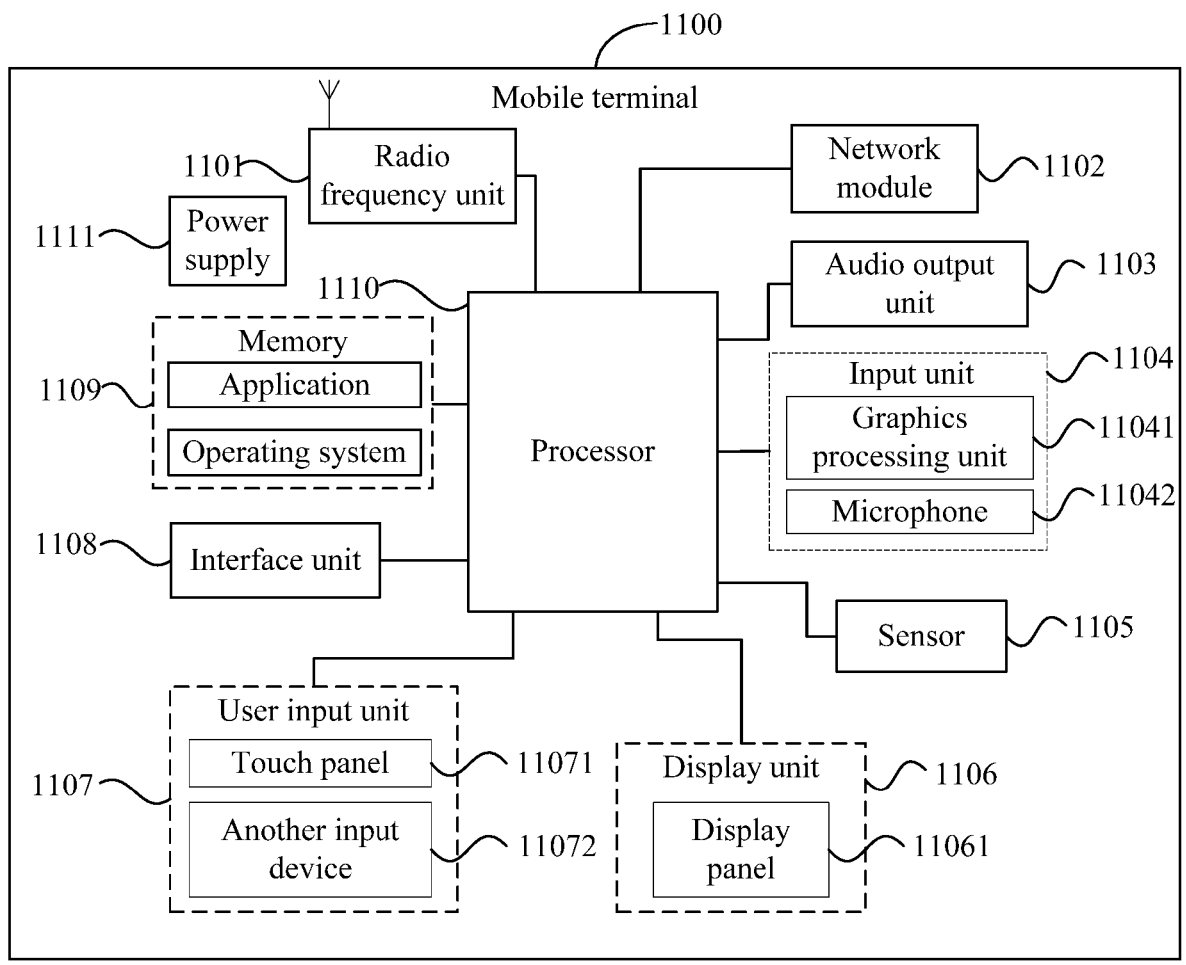
FIG. 11 is a schematic diagram of a hardware structure of a mobile terminal according to an embodiment of the present disclosure.

FIG. 11 is a schematic diagram of a hardware structure of a mobile terminal that implements the embodiments of the present disclosure.

The mobile terminal 1100 includes, but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art may understand that the structure of the mobile terminal shown in FIG. 11 constitutes no limitation on the mobile terminal, and the mobile terminal may include more or fewer parts than those shown in the figure, or combine some parts, or have a different part arrangement. In this embodiment of the present disclosure, the mobile terminal includes but is not limited to a mobile phone, a tablet computer, a laptop computer, a palmtop computer, an in-vehicle terminal, a wearable device, a pedometer, and the like.

The user input unit 1107 is configured to receive at least one first input; and the processor 1110 is configured to add, in response to each first input, at least one message input box to a message editing interface corresponding to a target contact.

The user input unit 1107 is further configured to receive at least one second input; the processor 1110 is further configured to send message content in a first target input box to the target contact in response to each second input, where the first target input box is one of message input boxes displayed in the message editing interface.

According to the mobile terminal 1100 provided in this embodiment of the present disclosure, message contents may be respectively edited in a plurality of message input boxes, which avoids a complicated process in which first message content that has been edited in a message input box needs to be first deleted, and then re-edited after second message content that needs to be first sent to the target contact is edited and sent to the target contact, thereby resolving problems such as that a required operation of temporarily adjusting an order of message contents to be sent in a message sending process is complicated and time-consuming, simplifying a user's operations, and helping improve message sending efficiency.

It should be understood that, in this embodiment of the present disclosure, the radio frequency unit 1101 may be configured to receive and send information or a signal in a call process. For example, after receiving downlink data from a base station, the radio frequency unit 1101 sends the downlink data to the processor 1110 for processing. In addition, the radio frequency unit 1101 sends uplink data to the base station. Generally, the radio frequency unit 1101 includes but is not limited to: an antenna, at least one amplifier, a transceiver, a coupler, a low noise amplifier, a duplexer, and the like. In addition, the radio frequency unit 1101 may further communicate with another device by using a wireless communications system and network.

The mobile terminal provides wireless broadband Internet access for the user by using the network module 1102, for example, helping the user to send and receive an e-mail, browse a web page, and access streaming media.

The audio output unit 1103 may convert audio data received by the radio frequency unit 1101 or the network module 1102 or stored in the memory 1109 into an audio signal and output the audio signal as sound. Moreover, the audio output unit 1103 may further provide audio output (for example, call signal receiving sound and message receiving sound) related to a specific function performed by the mobile terminal 1100. The audio output unit 1103 includes a loudspeaker, a buzzer, a telephone receiver, and the like.

The input unit 1104 is configured to receive an audio signal or a video signal. The input unit 1104 may include a graphics processing unit (GPU) 11041 and a microphone 11042. The graphics processing unit 11041 processes image data of a static picture or a video obtained by an image capture apparatus (for example, a camera) in video capture mode or image capture mode. A processed image frame may be displayed on the display unit 1106. An image frame processed by the graphics processing unit 11041 may be stored in the memory 1109 (or another storage medium) or sent by using the radio frequency unit 1101 or the network module 1102. The microphone 11042 may receive sound and can process the sound into audio data. The processed audio data may be converted, in a call mode, into a format that can be sent by the radio frequency unit 1101 to a mobile communication base station for output.

The mobile terminal 1100 further includes at least one sensor 1105, such as an optional sensor, a motion sensor, and another sensor. For example, the optional sensor includes an ambient light sensor and a proximity sensor. The ambient light sensor may adjust luminance of the display panel 11061 based on brightness of ambient light, and the proximity sensor may disable the display panel 11061 and/or backlight when the mobile terminal 1100 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information entered by a user or information provided for a user. The display unit 1106 may include a display panel 11061. The display panel 11061 may be configured in a form of a liquid crystal display (LCD), an organic light-emitting diode (OLED), or the like.

The user input unit 1107 may be configured to receive input digit or character information and generate key signal input related to user setting and function control of the mobile terminal. For example, the user input unit 1107 includes a touch panel 11071 and another input device 11072. The touch panel 11071 is also referred to as a touchscreen, and may collect a touch operation performed by a user on or near the touch panel 11071 (such as an operation performed by a user on the touch panel 11071 or near the touch panel 11071 by using any proper object or accessory, such as a finger or a stylus). The touch panel 11071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 1110, and can receive and execute a command sent by the processor 1110. In addition, the touch panel 11071 may be implemented as a resistive type, a capacitive type, an infrared type, a surface acoustic wave type, or the like. In addition to the touch panel 11071, the user input unit 1107 may further include another input device 11072. For example, the another input device 11072 may include but is not limited to a physical keyboard, function keys (for example, a volume control key and an on/off key), a trackball, a mouse, and a joystick. Details are not described herein.

Optionally, the touch panel 11071 may cover the display panel 11061. When detecting a touch operation on or near the touch panel 11071, the touch panel 11071 transmits the touch operation to the processor 1110 to determine a type of a touch event. Then, the processor 1110 provides corresponding visual output on the display panel 11061 based on the type of the touch event. In FIG. 11, although the touch panel 11071 and the display panel 11061 are used as two independent parts to implement input and output functions of the mobile terminal, in some embodiments, the touch panel 11071 and the display panel 11061 may be integrated to implement the input and output functions of the mobile terminal. Details are not described herein.

The interface unit 1108 is an interface for connecting an external apparatus with the mobile terminal 1100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 1108 may be configured to receive input (such as data information and power) from the external apparatus and transmit the received input to one or more elements in the mobile terminal 1100, or may be configured to transmit data between the mobile terminal 1100 and the external apparatus.

The memory 1109 may be configured to store a software program and various data. The memory 1109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 1109 may include a high-speed random access memory, or may include a nonvolatile memory, for example, at least one disk storage device, a flash memory, or another volatile solid-state storage device.

The processor 1110 is a control center of the mobile terminal, and is connected to all parts of the entire mobile terminal by using various interfaces and lines, and performs various functions of the mobile terminal and processes data by running or executing the software program and/or the module that are stored in the memory 1109 and invoking the data stored in the memory 1109, to implement overall monitoring on the mobile terminal. The processor 1110 may include one or more processing units. Optionally, the processor 1110 may integrate an application processor and a modem processor. The application processor mainly processes an operating system, a user interface, an application, and the like. The modem processor mainly processes wireless communication. It can be understood that the foregoing modem processor may not be integrated into the processor 1110.

The mobile terminal 1100 may further include a power supply 1111 (such as a battery) that supplies power to each component. Optionally, the power supply 1111 may be logically connected to the processor 1110 by using a power supply management system, to implement functions such as charging, discharging, and power consumption management by using the power supply management system.

In addition, the mobile terminal 1100 includes some function modules not shown, and details are not described herein.

Optionally, an embodiment of the present disclosure further provides a mobile terminal, including a processor 1110, a memory 1109, and a computer program stored in the memory 1109 and executable on the processor 1110. When the processor 1110 executes the computer program, the foregoing processes of the message sending method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when a processor executes the computer program, the foregoing processes of the message sending method embodiment are implemented and a same technical effect can be achieved. To avoid repetition, details are not described herein again. The non-transitory computer-readable storage medium may be a read-only memory (ROM), a random access memory (RAM), a magnetic disk, a compact disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiments may be implemented by using software in addition to a necessary universal hardware platform, or by using hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described with reference to the accompanying drawings. However, the present disclosure is not limited to the foregoing implementations. The foregoing implementations are merely an example, but are not limiting. A person of ordinary skill in the art may make many forms without departing from the objective and the scope of the claims of the present disclosure.

What is claimed is:

1. A message sending method, comprising:
   receiving at least one first input;
   adding, in response to each first input, at least one message input box to a message editing interface corresponding to a target contact;
   receiving at least one second input; and
   sending message content in a first target input box to the target contact in response to each second input, wherein the first target input box is one of message input boxes displayed in the message editing interface, wherein the receiving at least one second input comprises:

receiving a j-th second input for a send button, wherein j is a positive integer greater than 1; and the sending message content in a first target input box to the target contact in response to each second input comprises:

determining, in response to the j-th second input for a send button, a message input box arranged at the j-th position in the message input boxes that are arranged and displayed in a predetermined order in the message editing interface as the first target input box, and sending the message content in the first target input box to the target contact.

2. The message sending method according to claim 1, wherein the receiving at least one first input comprises:

receiving an i-th first input, wherein i is a positive integer; and the adding, in response to each first input, at least one message input box to a message editing interface corresponding to a target contact comprises:

adding, in response to the i-th first input, at least one message input box to the message editing interface at a position adjacent to a second target input box, wherein the second target input box is a message input box in an editing state in the message editing interface.

3. The message sending method according to claim 1, wherein after the sending message content in a first target input box to the target contact, the method further comprises:

deleting the first target input box, wherein the first target input box is a message input box arranged at the first position in the message input boxes that are arranged and displayed in a predetermined order in the message editing interface.

4. The message sending method according to claim 1, wherein each of the message input boxes displayed in the message editing interface corresponds to a send button; and the receiving at least one second input comprises:

receiving a second input for a target send button, wherein the target send button is one of send buttons corresponding to the message input boxes; and the sending message content in a first target input box to the target contact in response to each second input comprises:

sending, in response to the second input, message content in a message input box corresponding to the target send button to the target contact.

5. The message sending method according to claim 1, further comprising:

receiving a third input for a third target input box, wherein the third target input box is one of the message input boxes displayed in the message editing interface; and adjusting a display position of the third target input box in the message editing interface in response to the third input.

6. The message sending method according to claim 1, wherein each of the message input boxes displayed in the message editing interface corresponds to a delete button; and the method further comprises:

receiving a fourth input for a target delete button, wherein the target delete button is one of delete buttons corresponding to the message input boxes; and deleting, in response to the fourth input, a message input box corresponding to the target delete button.

7. A mobile terminal, comprising a processor, a memory, and a computer program stored in the memory and executable on the processor, wherein the computer program, when executed by the processor, causes the mobile terminal to perform:

receiving at least one first input;

adding, in response to each first input, at least one message input box to a message editing interface corresponding to a target contact;

receiving at least one second input; and sending message content in a first target input box to the target contact in response to each second input, wherein the first target input box is one of message input boxes displayed in the message editing interface, wherein the computer program, when executed by the processor, causes the mobile terminal to perform:

receiving a j-th second input for a send button for a send button, wherein j is a positive integer greater than 1; and determining, in response to the j-th second input, a message input box arranged at the j-th position in the message input boxes that are arranged and displayed in a predetermined order in the message editing interface as the first target input box, and sending the message content in the first target input box to the target contact.

8. The mobile terminal according to claim 7, wherein the computer program, when executed by the processor, causes the mobile terminal to perform:

receiving an i-th first input, wherein i is a positive integer; and adding, in response to the i-th first input, at least one message input box to the message editing interface at a position adjacent to a second target input box, wherein the second target input box is a message input box in an editing state in the message editing interface.

9. The mobile terminal according to claim 7, wherein the computer program, when executed by the processor, causes the mobile terminal to further perform:

deleting the first target input box, wherein the first target input box is a message input box arranged at the first position in the message input boxes that are arranged and displayed in a predetermined order in the message editing interface.

10. The mobile terminal according to claim 7, wherein each of the message input boxes displayed in the message editing interface corresponds to a send button; and the computer program, when executed by the processor, causes the mobile terminal to perform:

receiving a second input for a target send button, wherein the target send button is one of send buttons corresponding to the message input boxes; and sending, in response to the second input, message content in a message input box corresponding to the target send button to the target contact.

11. The mobile terminal according to claim 7, wherein the computer program, when executed by the processor, causes the mobile terminal to further perform:

receiving a third input for a third target input box, wherein the third target input box is one of the message input boxes displayed in the message editing interface; and adjusting a display position of the third target input box in the message editing interface in response to the third input.

12. The mobile terminal according to claim 7, wherein each of the message input boxes displayed in the message editing interface corresponds to a delete button; and the computer program, when executed by the processor, causes the mobile terminal to perform:

receiving a fourth input for a target delete button, wherein the target delete button is one of delete buttons corresponding to the message input boxes; and deleting, in response to the fourth input, a message input box corresponding to the target delete button.

13. A non-transitory computer-readable storage medium, wherein the non-transitory computer-readable storage medium stores a computer program, and the computer program, when executed by a processor of a mobile terminal, causes the mobile terminal to perform:

receiving at least one first input;

adding, in response to each first input, at least one message input box to a message editing interface corresponding to a target contact;

receiving at least one second input; and sending message content in a first target input box to the target contact in response to each second input, wherein the first target input box is one of message input boxes displayed in the message editing interface, wherein the computer program, when executed by the processor, causes the mobile terminal to perform:

receiving a j-th second input for a send button, wherein j is a positive integer greater than 1; and determining, in response to the j-th second input for a send button, a message input box arranged at the j-th position in the message input boxes that are arranged and displayed in a predetermined order in the message editing interface as the first target input box, and sending the message content in the first target input box to the target contact.

14. The non-transitory computer-readable storage medium according to claim 13, wherein the computer program, when executed by the processor, causes the mobile terminal to perform:

receiving an i-th first input, wherein i is a positive integer; and adding, in response to the i-th first input, at least one message input box to the message editing interface at a position adjacent to a second target input box, wherein the second target input box is a message input box in an editing state in the message editing interface.

15. The non-transitory computer-readable storage medium according to claim 13, wherein the computer program, when executed by the processor, causes the mobile terminal to further perform:

deleting the first target input box, wherein the first target input box is a message input box arranged at the first position in the message input boxes that are arranged and displayed in a predetermined order in the message editing interface.

16. The non-transitory computer-readable storage medium according to claim 13, wherein each of the message input boxes displayed in the message editing interface corresponds to a send button; and the computer program, when executed by the processor, causes the mobile terminal to perform:

receiving a second input for a target send button, wherein the target send button is one of send buttons corresponding to the message input boxes; and sending, in response to the second input, message content in a message input box corresponding to the target send button to the target contact.

17. The non-transitory computer-readable storage medium according to claim 13, wherein each of the message input boxes displayed in the message editing interface corresponds to a delete button; and the computer program, when executed by the processor, causes the mobile terminal to perform:

receiving a fourth input for a target delete button, wherein the target delete button is one of delete buttons corresponding to the message input boxes; and deleting, in response to the fourth input, a message input box corresponding to the target delete button.

* * * * *